US011654564B2

(12) United States Patent
Fan

(10) Patent No.: US 11,654,564 B2
(45) Date of Patent: May 23, 2023

(54) EFFICIENT DATA GENERATION FOR GRASP LEARNING WITH GENERAL GRIPPERS

(71) Applicant: FANUC CORPORATION, Yamanashi (JP)

(72) Inventor: Yongxiang Fan, Union City, CA (US)

(73) Assignee: FANUC CORPORATION, Yamanashi (JP)

( * ) Notice: Subject to any disclaimer, the term of this patent is extended or adjusted under 35 U.S.C. 154(b) by 408 days.

(21) Appl. No.: 17/016,731

(22) Filed: Sep. 10, 2020

(65) Prior Publication Data
US 2022/0072707 A1 Mar. 10, 2022

(51) Int. Cl.
*G05B 19/04* (2006.01)
*B25J 9/16* (2006.01)
(Continued)

(52) U.S. Cl.
CPC ............ *B25J 9/1669* (2013.01); *B25J 9/161* (2013.01); *B25J 9/1605* (2013.01); *B25J 9/1612* (2013.01);
(Continued)

(58) Field of Classification Search
CPC ........ B25J 9/1669; B25J 9/1605; B25J 9/161; B25J 9/1612; B25J 9/1671; B25J 9/1697; B25J 9/163; B25J 15/0028; G06N 3/08; G06N 5/04; G06N 3/008; G06N 3/0454; G06T 7/593; G06T 7/70; G06T 2207/10028; G06T 2207/20081;
(Continued)

(56) References Cited

U.S. PATENT DOCUMENTS 9,669,543 B1 * 6/2017 Stubbs .................. B25J 9/1612
10,131,051 B1 * 11/2018 Goyal ................... B25J 9/1697
(Continued)

OTHER PUBLICATIONS

"Fast Grasping of unknown objects using force balance optimization" by Lei, International Conference on Intelligent robots and systems. (Year: 2014).*

(Continued)

*Primary Examiner* — Abby Y Lin
*Assistant Examiner* — Sohana Tanju Khayer
(74) *Attorney, Agent, or Firm* — John A. Miller; Shumaker, Loop & Kendrick, LLP

(57) ABSTRACT

A grasp generation technique for robotic pick-up of parts. A database of solid or surface models is provided for all objects and grippers which are to be evaluated. A gripper is selected and a random initialization is performed, where random objects and poses are selected from the object database. An iterative optimization computation is then performed, where many hundreds of grasps are computed for each part with surface contact between the part and the gripper, and sampling for grasp diversity and global optimization. Finally, a physical environment simulation is performed, where the grasps for each part are mapped to simulated piles of objects in a bin scenario. The grasp points and approach directions from the physical environment simulation are then used to train neural networks for grasp (Continued)

learning in real-world robotic operations, where the simulation results are correlated to camera depth image data to identify a high quality grasp.

16 Claims, 4 Drawing Sheets

(51) Int. Cl.
| | |
|---|---|
| G06N 3/08 | (2023.01) |
| G06T 7/593 | (2017.01) |
| G06T 7/70 | (2017.01) |
| G06N 5/04 | (2023.01) |
| G06V 20/10 | (2022.01) |
| G06V 20/64 | (2022.01) |
| B25J 15/00 | (2006.01) |

(52) U.S. Cl.
CPC .......... *B25J 9/1671* (2013.01); *B25J 9/1697* (2013.01); *G06N 3/08* (2013.01); *G06N 5/04* (2013.01); *G06T 7/593* (2017.01); *G06T 7/70* (2017.01); *G06V 20/10* (2022.01); *G06V 20/64* (2022.01); *B25J 9/163* (2013.01); *B25J 15/0028* (2013.01); *G06T 2207/10028* (2013.01)

(58) Field of Classification Search
CPC . G06T 2207/20084; G06T 7/73; G06V 20/10; G06V 20/64; G06V 10/82; G06V 20/52; G05B 19/042
See application file for complete search history.

(56) References Cited

U.S. PATENT DOCUMENTS

| | | | |
|---|---|---|---|
| 11,494,632 B1* | 11/2022 | Bai | B25J 9/163 |
| 2006/0012198 A1* | 1/2006 | Hager | B25J 9/1612 |
| | | | 294/106 |
| 2014/0163731 A1* | 6/2014 | Shi | B25J 9/0096 |
| | | | 700/250 |
| 2017/0039304 A1* | 2/2017 | Kim | G06Q 10/08 |
| 2017/0080566 A1* | 3/2017 | Stubbs | G05B 19/418 |
| 2017/0252924 A1* | 9/2017 | Vijayanarasimhan | |
| | | | G06N 3/0454 |
| 2018/0281200 A1* | 10/2018 | Rosenstein | B25J 9/1656 |
| 2020/0269422 A1* | 8/2020 | Huang | B25J 9/1669 |
| 2021/0131874 A1* | 5/2021 | Xu | G01J 3/463 |
| 2021/0158561 A1* | 5/2021 | Park | G06T 15/20 |

OTHER PUBLICATIONS

"Teaching method for robot's gripper posture with a laser sensor on a pan-tilt actuator: a method for specifying posture feature curves and posture feature point", by Ishihata; 28th IEEE conference on robot and human interactive communication (Year: 2019).*

Jeffrey Mahler, Matthew Matl, Vishal Satish, Michael Danielczuk, Bill Derose, Stephen McKinley, Ken Goldberg "Learning ambidextrous robot grasping policies." Science Robotics, Jan. 16, 2019, pp. 1-11, vol. 4, Washington, DC.

Sergey Levine, Peter Pastor, Alex Krizhevsky,Julian Ibarz, Deidre Quillen "Learning hand-eye coordination for robotic grasping with deep learning and large-scale data collection." The International Journal of Robotics Research, 2018 pp. 421-436, vol. 37.4-5.

* cited by examiner

EFFICIENT DATA GENERATION FOR GRASP LEARNING WITH GENERAL GRIPPERS

BACKGROUND

Field

The present disclosure relates generally to a method for generating quality grasp poses for robot grasping of parts and, more particularly, to a method for robot grasp learning comprising a random initialization where random objects and grippers are selected from a large object database, an iterative optimization where many hundreds of grasps are computed for each part with surface contact between the part and the gripper, and a physical environment simulation where the grasps for each part are applied to simulated piles of objects in a bin.

Discussion of the Related Art

The use of industrial robots to perform a wide range of manufacturing, assembly and material movement operations is well known. One such application is a pick and place operation, such as where a robot picks up individual parts from a bin and places each part on a conveyor or a shipping container. An example of this application would be where parts which have been molded or machined are dropped into the bin and settle in random locations and orientations, and the robot is tasked with picking up each part and placing it in a predefined orientation (pose) on a conveyor which transports the parts for packaging or for further processing. Another example is in warehouses fulfilling e-commerce orders, where many different sizes and shapes of items need to be handled reliably. Depending on the extent to which the parts in the bin are nestled together in a pile, finger-type graspers or suction-type grippers may be used as the robot tool. A vision system (one or more cameras) is typically used to identify the position and orientation of individual parts in the bin.

Traditional grasp generation methods manually teach picking points on known 3D features or objects. These methods require significant time spent on heuristics design in order to identify the best grasp poses, and manually designed heuristics may not work on unknown objects or occlusions. Because of the difficulties of using heuristics grasp teaching, learning-based grasp detection methods have become popular due to their ability to adapt to unknown objects.

However, existing learning-based grasp detection methods also have their downsides. One known learning-based technique uses a mathematically rigorous grasp quality to search for grasp candidates before feeding these candidates to a convolutional neural network (CNN) classifier, but this method is usually computationally expensive, and the solution may not be optimal in the real world due to the simplification included in the optimization. To produce realistic grasps, another method uses empirical trials to collect data, but this method usually requires tens of thousands of robot hours with complicated force controls, and any change of the gripper requires a repeat of the whole process.

In light of the circumstances described above, there is a need for a robot grasp learning technique which generates high quality grasp candidates without manual teaching, is computationally efficient, and provides grasp scenarios which are applicable to real-world situations involving jumbled-together parts and collision avoidance between the robot arm and bin sides.

SUMMARY

In accordance with the teachings of the present disclosure, a grasp generation technique for robotic pick-up of parts is presented. A database of solid or surface models is provided for all objects and grippers which are to be evaluated. A gripper is selected and a random initialization is performed, where random objects are selected from the object database and poses are randomly initiated. An iterative optimization computation is then performed, where many hundreds of grasps are computed for each part with surface contact between the part and the gripper, and sampling for grasp diversity and global optimization. Finally, a physical environment simulation is performed, where the grasps for each part are mapped to simulated piles of objects in a bin scenario. The grasp points and approach directions from the physical environment simulation are then used to train neural networks for grasp learning in real-world robotic operations, where the simulation results are correlated to camera depth image data to identify a high quality grasp.

Additional features of the presently disclosed methods will become apparent from the following description and appended claims, taken in conjunction with the accompanying drawings.

DETAILED DESCRIPTION OF THE EMBODIMENTS

Figure 1:
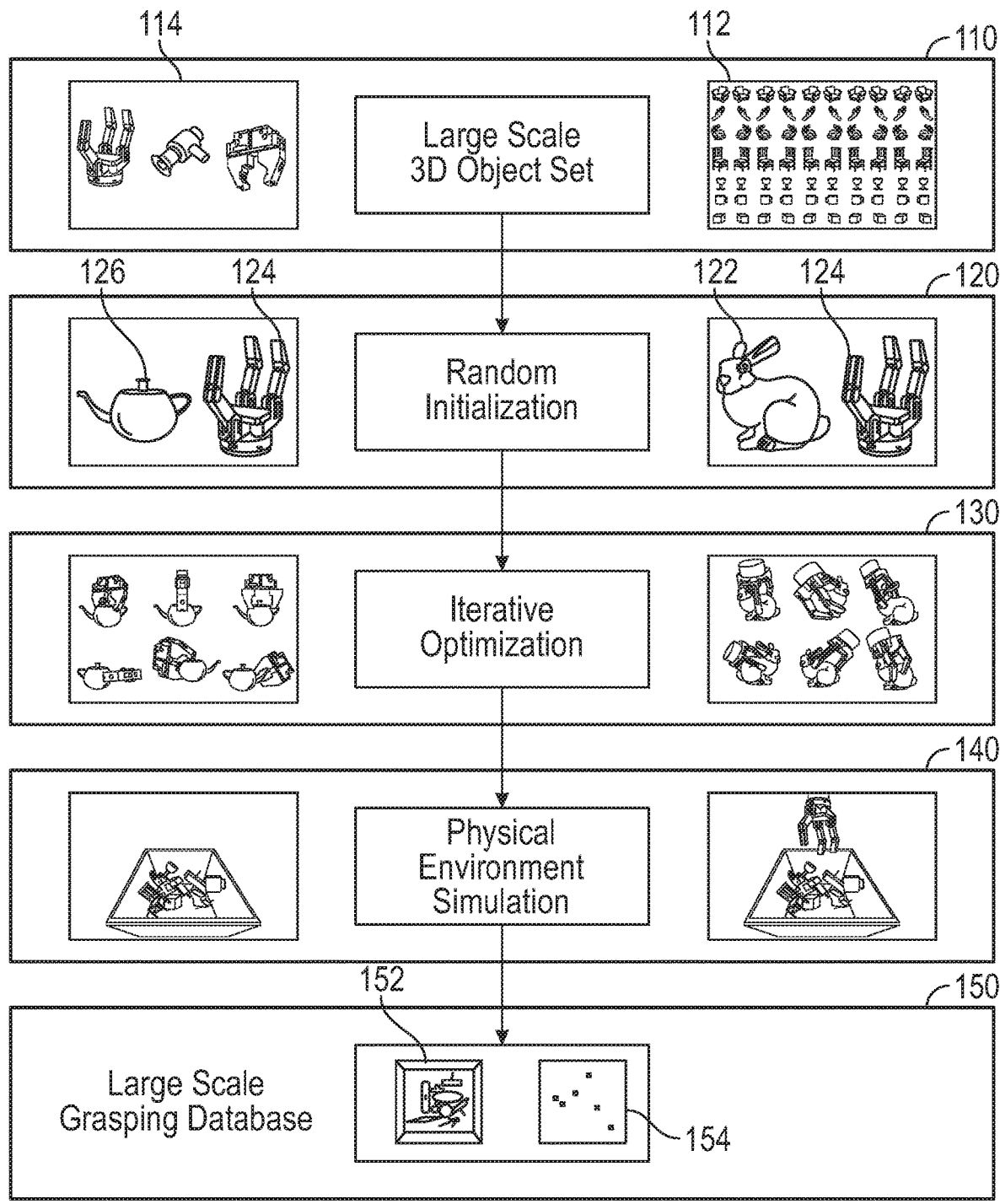
FIG. 1 is an illustrated flowchart diagram of a grasp generation process which computes optimized grasps on individual objects and applies the computed grasps to objects in simulated object piles, according to an embodiment of the present disclosure.

The following discussion of the embodiments of the disclosure directed to an optimization-based grasp generation technique is merely exemplary in nature, and is in no way intended to limit the disclosed techniques or their applications or uses.

The use of industrial robots for picking parts from a source and placing them at a destination is well known. In one common application, a supply of parts is provided in a bin, such as a bin containing a random pile of parts which have just been cast or molded, where the parts need to be moved from the bin to a conveyor or a shipping container.

Teaching a robot to recognize and grasp an individual part in a bin full of parts, in real time, has always been challenging.

In order to improve the speed and reliability of robotic part picking operations, it is known to pre-compute grasps for a specified gripper grasping a particular part in a variety of poses. This pre-computing of grasps is known as grasp generation, and the pre-computed (generated) grasps are then used to make decisions in real time during robotic part picking operations.

Traditional grasp generation methods manually teach picking points on known 3D features on objects. These methods require significant time spent on heuristics design in order to identify the best grasp poses, and these manually designed heuristics may not work on unknown objects or occlusions. Because of the difficulties of using heuristics grasp teaching, learning-based grasp detection methods have become popular due to their ability to adapt to unknown objects.

However, existing learning-based grasp generation methods also have downsides. One known learning-based technique uses a mathematically rigorous grasp quality to search for grasp candidates before feeding these candidates to a CNN classifier, but is computationally expensive, and the solution may not be optimal in real world situations due to simplifications used in the optimization. Another method uses empirical trials to collect data producing realistic grasps, but this method usually requires tens of thousands of robot hours with complicated force controls, and any change of the gripper requires a repeat of the whole process. In addition, some existing grasp generation methods are limited in the types of grasp poses they can identify, such as being limited to only a direct top-down approach direction.

The present disclosure describes a technique which can be automatically applied to any combination of gripper and part/object designs, produces a large number of realistic grasps in simulation with minimal computation efforts, and further simulates the complication of grasping an individual part from a pile of parts jumbled together in a bin as is often encountered in real world robotic part picking operations. To increase the robustness of the grasps, a mathematically rigorous grasp quality is used, and the contacts are modeled as surfaces. A specially designed solver is used to solve the optimization efficiently. Finally, the generated grasps are tested and refined in a physical environment simulation step to consider the gripper-to-part interferences encountered in cluttered environments. The grasps generated and evaluated in this manner are then used in actual robotic part picking operations to identify a target object and grasp pose from 3D camera images.

FIG. 1 is an illustrated flowchart diagram 100 of a grasp generation process which computes optimized grasps on individual parts/objects and applies the computed grasps to objects in simulated object piles, according to an embodiment of the present disclosure. At box 110, a database 112 of three-dimensional (3D) object models is provided. The object model database 112 may include many hundreds of different objects for which grasps are to be generated, with 3D solid or surface data (typically from a CAD model) provided for each object. The object model database 112 may also include data from a widely available shared-source repository such as ShapeNet.

A gripper database 114 is also provided at the box 110, including both 3D geometric and articulation data for each gripper. For example, one particular gripper might have three mechanical fingers, with each finger including two knuckle joints and two finger segments; the 3D geometry of this gripper would be provided in a certain configuration, such as with the knuckle joints all flexed fully open, and joint pivot axis geometry also provided. Many different styles of grippers may be included in the gripper database 114—including two- and three-finger articulated grippers, parallel-jaw grippers, full-human-hand style grippers, underconstrained actuation grippers, suction cup style grippers (single or multiple cups), etc.

At random initialization box 120, a group of objects (e.g. 10-30 objects) is randomly selected from the object model database 112, and a gripper for each object is also selected from the gripper database 114. For example, a rabbit 122 (which might be a molded plastic toy) and a corresponding three-finger gripper 124 are shown, where the rabbit 122 is simply one of the objects in the object database 112 and the gripper 124 is one of the grippers included in the gripper database 114.

As another example, a teapot object 126 is shown with the same gripper 124. To be clear, each object selected at the random initialization box 120, along with the selected gripper, will be analyzed independently to generate many robust grasps for the object, as discussed in detail below. Multiple objects (e.g. 10-30 objects) may be selected (randomly, or user-selected) simply for ease of operation, where the grasp generation computations are performed automatically for all of the objects selected at the box 120. In the preferred embodiment, the same gripper (the gripper 124 in this example) is used for all of the objects selected at the box 120, because later analysis may include piling many or all different objects in a bin together and picking the objects one at a time using a robot fitted with the gripper.

At box 130, an iterative optimization computation is performed on each object/gripper pairing to generate and store many robust grasps. In one embodiment, the iterative optimization routine is configured to calculate 1000 grasps for each object and the selected gripper. More or fewer than 1000 grasps could of course be computed. The iterative optimization computation models surface contact between the object and the gripper, while preventing collision or penetration. The computation uses a solver specifically designed for efficiency in order to compute each grasp very quickly. Initial conditions (gripper pose relative to object) are varied to provide a diverse mix of robust grasps. The iterative optimization computation at the box 130 is discussed in detail below.

At box 140, the group of objects selected in the random initialization box 120 is used in a simulation of a physical environment (i.e., simulation of the parts dropped randomly into a bin and settling into a pile) and the associated grasps from the box 130 are mapped onto the physical environment. The simulated pile of objects in a bin at the box 140 may include many different types of objects (e.g., all of the objects selected at the box 120), or may include a bin filled with objects all of a single type. The simulation runs in parallel to test the performance of each grasp in a cluttered environment. The physical environment simulation at the box 140 is also discussed further below.

At box 150, the point cloud, the grasp pose, and the success rate from the physical environment simulation at the box 140 are recorded to form the grasping database. A point cloud depth image 152 depicts the pile of objects from the box 140 from a particular perspective or point of view. In a preferred embodiment, the depth image 152 is as viewed from the approach direction computed for a best grasp. From the image 152, the computations at the box 140 determined several candidate grasps which could be employed by the robot gripper. Each of the candidate grasps is represented by a grasp pose and point map 154—indicating points which could be used as a grasp target, with the angle of approach defined by the point of view of the image 152, and using a gripper angle and grip width computed at the box 140. Thus, the data stored at the box 150 includes the depth map from the desired approach angle, the point map 154 indicating the x/y/z coordinates of grasps including the best grasp, the gripper rotation angle and gripper width, and the grasp success rate from the physical environment simulation. The points in the point map 154 would be rank ordered in terms of grasp quality, and should result in a successful grasp of an object from the pile of objects in a bin.

The grasps generated and evaluated in the manner depicted in the flowchart diagram 100 of FIG. 1, and stored at the box 150, are later used to train a grasp learning system to identify the best grasp pose from 3D camera images of an actual bin full of parts.

Figure 2:
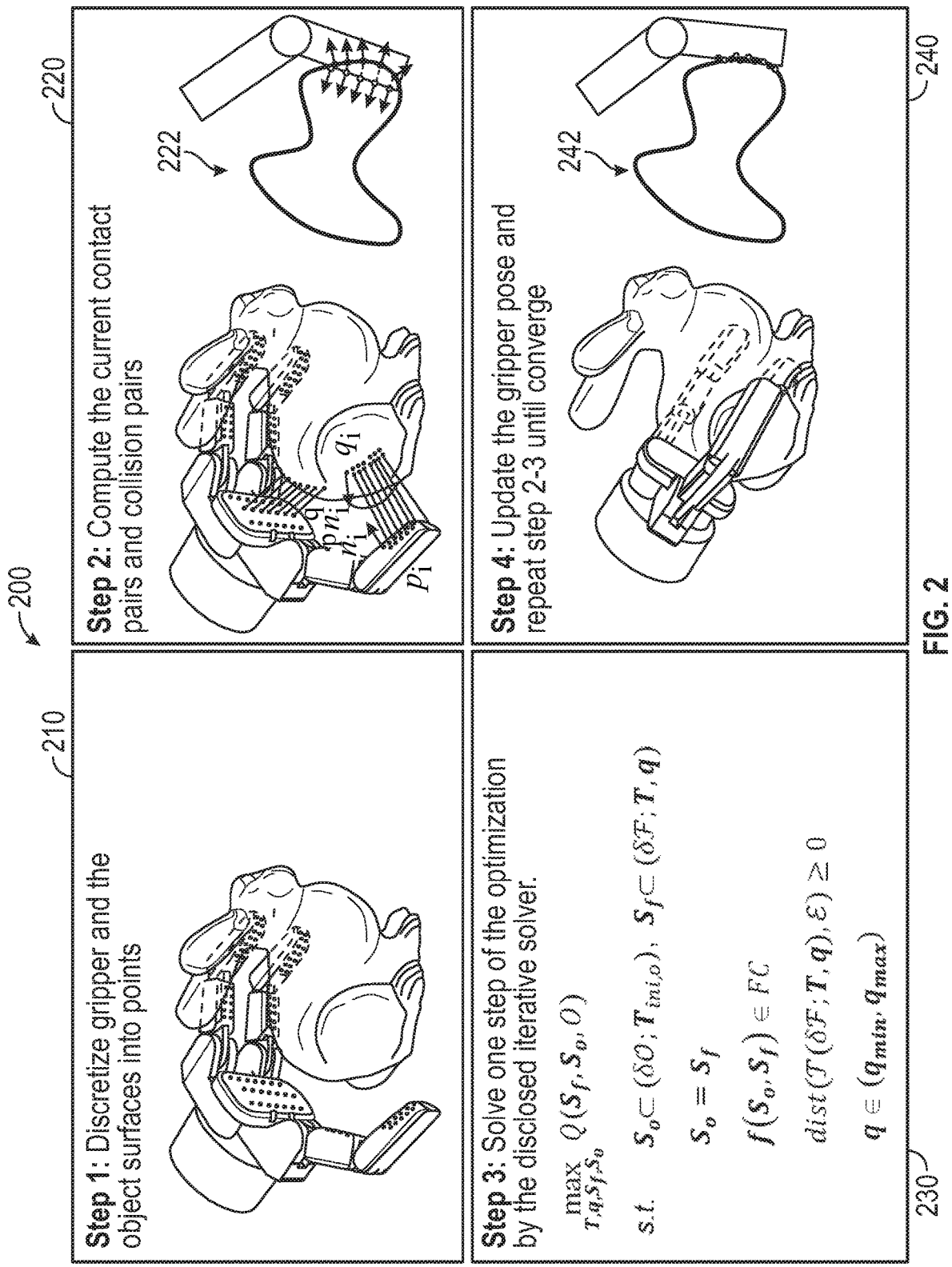
FIG. 2 is an illustrated flowchart diagram of steps included in the iterative optimization box of the grasp generation process of FIG. 1, according to an embodiment of the present disclosure.

FIG. 2 is an illustrated flowchart diagram 200 of steps included in the iterative optimization box 130 of the grasp generation process of FIG. 1, according to an embodiment of the present disclosure. The iterative optimization computation of the flowchart diagram 200 is performed on each object/gripper pairing to generate and store many robust grasps.

At box 210, the surfaces of the gripper and the object are discretized into points. Points on the gripper surfaces (the palm surface and the inside surfaces of the segments of the fingers) are designated as $p_i$, with each point $p_i$ having a normal vector $n_i^p$. Points on the object exterior surface are designated as $q_i$, with each point $q_i$ having a normal vector $n_i^q$.

At box 220, based on a current gripper pose relative to the object (discussed later in terms of overall gripper position, and individual finger joint positions), point contact pairs and collision pairs are computed. This begins with identifying matching points on the gripper surfaces with nearest points on the object surface, using a nearest neighbor technique. After filtering to remove point pairs having a distance exceeding a threshold value, the remaining point pairs $(p_i, q_i)$ define the contact surfaces $S_f$ (on gripper) and $S_o$ (on object).

At 222, a cross section of the object and one finger of the gripper are shown, with corresponding point pairs $(p_i, q_i)$, along with the respective surface normal vectors. In the position shown at 222 (which might be an initial position, or any other iteration during the optimization process), there is interference between the object and the outer segment of the gripper finger. This interference will be penalized using a constraint function in the optimization calculations in order to cause the gripper to move away from the object to eliminate the interference, as discussed below.

At box 230, the grasp searching problem is modeled as an optimization, and one iteration is computed. To compute stable grasps, surface contacts and rigorous mathematic quality are adopted in the modeling. Gripper-object collision is also penalized in the optimization to avoid penetration, as mentioned above. The optimization formulation shown in the box 230 is duplicated here as Equations (1a)-(1f), and is discussed in the following paragraphs.

$$\max_{T,q,S_f,S_o} Q(S_f, S_o, O) \quad (1a)$$

$$\text{s.t. } S_o \subset (\delta O; T_{ini,o}), S_f \subset (\delta \mathcal{F}; T, q) \quad (1b)$$

$$S_o = S_f \quad (1c)$$

$$f(S_o, S_f) \in FC \quad (1d)$$

$$dist(\mathcal{T}(\delta \mathcal{F}; T, q), \mathcal{E}) \geq 0 \quad (1e)$$

$$q \in (q_{min}, q_{max}) \quad (1f)$$

The optimization formulation includes an objective function (Eq. 1a) defined to maximize grasp quality Q, where the grasp quality Q is related to the contact surfaces $S_f$ and $S_o$ and the object geometry O. The grasp quality Q may be defined in any suitable manner, and is computed from the force contributions of all of the contact points relative to object properties such as mass and center of gravity. A stable grasp is one in which any minor movement of the object in the gripper is quickly stopped by friction forces and does not lead to a loss of grip.

The optimization formulation of Equations (1a)-(1f) includes many constraint functions. A constraint function (Eq. 1 b) indicates that $S_o$ is a subset of the object surface $\delta O$ transformed by object initial pose $T_{into}$, and $S_f$ is a subset of the hand/gripper surface $\delta \mathcal{F}$ transformed by gripper pose and joint positions (T,q). A constraint function (Eq. 1c) indicates that the object contact surface $S_o$ and the hand/gripper contact surface $S_f$ are identical.

A constraint function (Eq. 1d) indicates that the contact force f remains in the friction cone FC during the gripper-object interaction. The friction cone FC is characterized by penalizing the deviation of the finger force to the centerline of the friction cone, where the friction cone is a cone in which the resultant force exerted by one surface on another must be located when both surfaces are at rest as determined by the coefficient of static friction, as is known in the art. A constraint function (Eq. 1 e) indicates that the transformed hand surface $(\mathcal{T}(\delta \mathcal{F}; T,q))$ should not penetrate with the environment E; that is, the distance should be greater than or equal to zero.

A constraint function (Eq. 1f) indicates that the joint positions q stay in a space constrained by $q_{min}$ and $q_{max}$, where the joint position boundaries $q_{min}$ and $q_{max}$ are known and given for the selected gripper. For example, the finger joints of the depicted three-finger gripper are constrained to have an angular position between $g_{min}=0°$ (straight finger extension) and an angle of around $q_{max} \approx 140°-180°$ (maximum inward flex; each joint in the gripper has a specific value of $q_{max}$ in this range).

The optimization formulation of Equations (1a)-(1f) remains a non-convex problem due to the nonlinear kinematics and the contact surfaces in $S_f \subset (\delta \mathcal{F}; T, q)$. To resolve the kinematic nonlinearity, searching is changed from hand/gripper configuration T,q to increment of the hand/gripper configuration $\delta T$, $\delta q$. Specifically, $T=\delta T\, T_0$, $q=\delta g+q_0$, with $T_0,q_0$ denoting the current hand/gripper configuration. In the present disclosure, $\delta T=(R,t)$ is called transformation.

To resolve the nonlinearity introduced by surface contacts and solve Equations (1a)-(1f) by gradient-based methods, the hand/gripper surface $\delta \mathcal{F}$ and object surface $\delta O$ are discretized into point sets $\{p_i,\, n_i^p\}_{i=1}^{N_p}$ and $\{q_i,n_i^q\}_{i=1}^{N_q}$, respectively, where $p_i,q_i \in \mathbb{R}^3$, $n_i^P,n_i^q \in \mathbb{S}^2$ represent the point positions and normal vectors. The point discretization was discussed above with respect to the boxes 210 and 220.

Using the nearest neighbor point matching approach discussed above to define $S_f$ and $S_o$, a contact closeness penalty can be formulated using a translational Jacobian matrix at a point $p_i$ and describing the point distance in surface normal direction of the object. This point-to-plane distance allows points on the gripper to reside and slide on the object surface. It also reduces the sensitivity of the algorithm to incomplete point cloud data.

The collision constraint (Eq. 1 e) is penalized and formulated in a way that penalizes collision only for those points that are currently in penetration. The collision approximation introduces a differential form with respect to $\delta T, \delta q$; thus the computational efficiency is significantly improved. However, the approximated penalty is discontinuous as the hand moves due to the absence of preview. Therefore, the optimized $\delta T, \delta q$ may exhibit a zig-zagging behavior. To reduce the effect of zig-zagging caused by the approximation, the hand surface may be inflated to preview the possible collision.

Returning now to FIG. 2, the preceding discussion describes the optimization formulation at the box 230, including the convexification simplifications which enable the optimization computation to be performed very quickly. At box 240, the gripper pose with respect to the object is updated (both the gripper base/palm pose T and the joint positions q) and the steps of the boxes 220 (compute contact point pairs and collision point pairs) and 230 (solve an iteration of the optimization problem) are repeated until the optimization formulation converges to a predefined threshold.

The steps shown in the illustrated flowchart diagram 200 of FIG. 2 compute a single grasp of the object (such as the rabbit 122) by the gripper (e.g., 124). That is, when the optimization computation converges, a single grasp with suitable quality and no interference/penetration is provided. In the cross section shown at 242, it can be seen that the interference between the object and the gripper finger has been eliminated by relaxing the angle of the gripper finger joint, such that the point pairs $(p_i, q_i)$ are just in contact.

As discussed earlier, it is desirable to compute many different grasps for each object/gripper pair. In one embodiment, the iterative optimization routine is configured to calculate 1000 grasps for each object using the selected gripper.

It is also desirable to sample from different initial grasp poses in order to obtain different converged grasps, so that the resultant grasps are comprehensive. In other words, initial conditions (gripper pose relative to object) are varied randomly for each of the 1000 computed grasps. This is done because the optimization formulation of Equations (1a)-(1f) converges to a local optimum. In order to obtain grasps (of the rabbit 122 for example) on different parts of the head and body, from all different directions (from front, from back, from above and below, etc.), the initial conditions must reflect the diversity of approach directions and target grasp locations.

Even with initial conditions varied to provide a diversity of grasp poses, there will inevitably be many very similar grasps given the large number of grasps (e.g., 500-1000) computed in the iterative optimization step. For example, it can easily be envisioned that many similar grasps of the rabbit 122 by the head, from the front, will be computed. For this reason, after the 500-1000 grasps are computed for an object, the grasps are grouped by similar pose, and an average is computed. In one embodiment of the grasp generation methodology, only the average grasp is stored. In other words, for example, all of the grasps of the rabbit 122 by the head, from the front, are averaged into a single stored grasps. Likewise for other approach directions and grasp locations. In this way, the 500-1000 computed grasps may be reduced to a number of stored grasps in a range of 20-50, where each of the stored grasps is significantly different from the other stored grasps.

Figure 3:
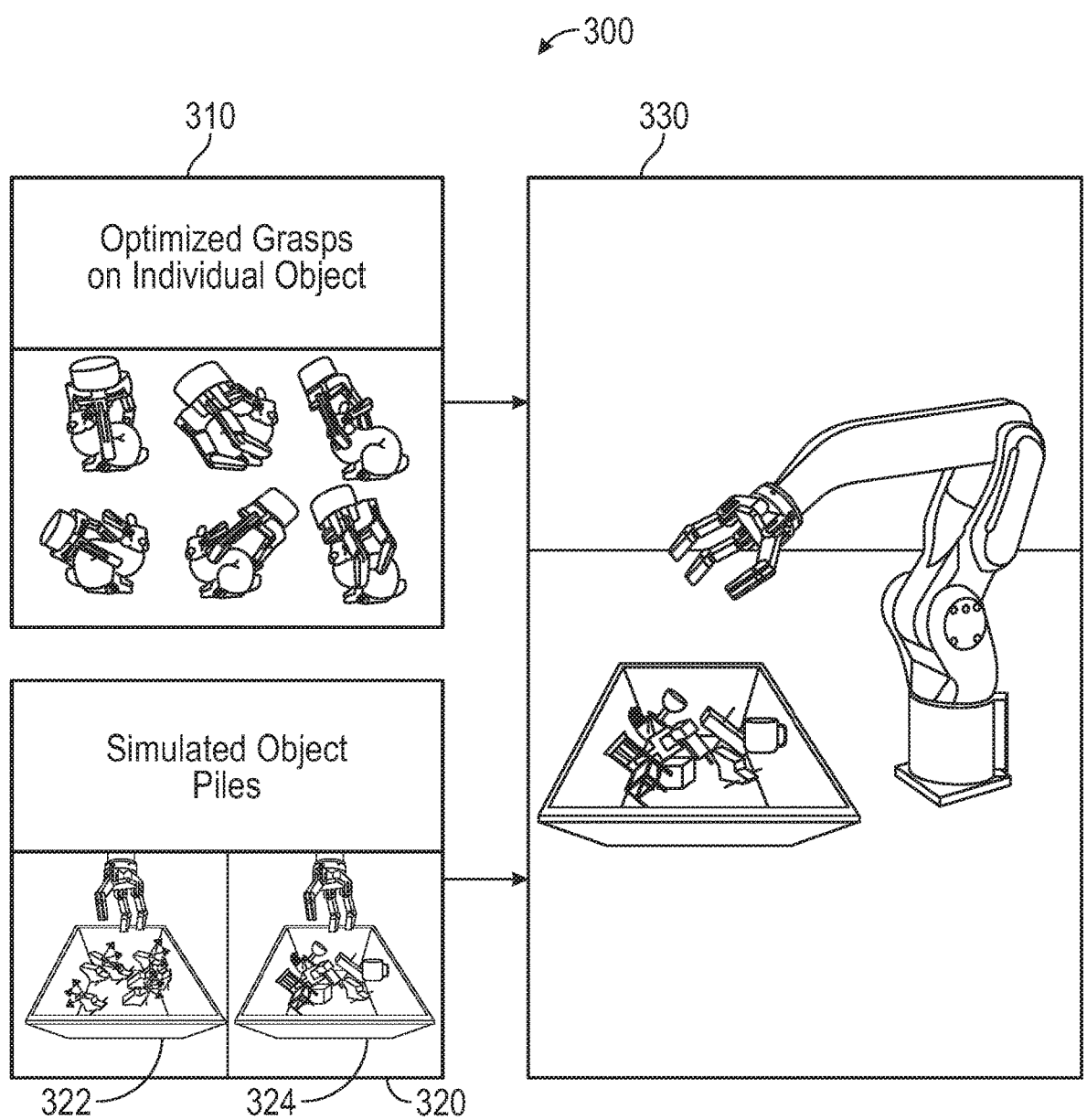
FIG. 3 is an illustrated flowchart diagram of steps included in the physical environment simulation box of the grasp generation process of FIG. 1, according to an embodiment of the present disclosure.

FIG. 3 is an illustrated flowchart diagram 300 of steps included in the physical environment simulation box 140 of the grasp generation process of FIG. 1, according to an embodiment of the present disclosure. At box 310, a set of optimized grasps on individual objects (for a particular gripper) is provided. The optimized grasps are computed and provided by the iterative optimization process of the box 130 (FIG. 1) and the flowchart diagram 200 of FIG. 2. As discussed above, the optimized grasps are preferably the stored grasps (20-50 in number), representing a diversity of grasp positions/angles, where each of the stored grasps is significantly different from the others.

At box 320, a simulated pile of objects is provided. The objects may all be of the same type (shown in bin 322), or the objects may include many different types (such as those provided in the random initialization step at the box 120 of FIG. 1—and shown in bin 324). The grasps provided at the box 310 must include all of the object types (if more than one) in the simulated pile, using the same gripper. The simulated pile of objects is provided at the box 320 using an actual dynamic simulation of the objects being dropped in random orientations into a bin, landing in the bottom of the bin, colliding with other objects which have already landed, tumbling down the sides of the growing pile until reaching an equilibrium position, etc. The dynamic simulation of the object pile includes actual part shapes, bin size/shape and surface-to-surface contact simulations for advanced realism.

After the simulated pile of objects in a bin is provided at the box 320, the grasps provided at the box 310 (recorded optimized grasps) are mapped to the simulated pile of objects. This step is shown at box 330. Because the simulated pile of objects includes known locations of the individual objects, object pose and identity can be used to map the optimized grasps onto the simulated object piles. This results in a simulated grasp of an object, including the 3D depth map of the pile of objects, the identity of the selected object, the corresponding approach angle, grasp point in three dimensions, the gripper angle and gripper width (or finger joint positions).

The exposed surfaces of the simulated pile of objects are modeled as a 3D point cloud or depth map. Because the simulated pile of objects includes known locations of the individual objects, a 3D depth map can be computed from any suitable point of view (angles amenable to robot grasping, such as within 30° of vertical). The 3D depth map from the point of view of each simulated grasp can then be analyzed to find the correlation between exposed portions of objects in the 3D depth map and the corresponding simulated grasp using one of the stored optimized grasps.

Providing a simulated pile of objects (the box 320) may be repeated many times for a given set of optimized grasps. Each simulated pile of objects uses a different random stream of objects and orientations being dropped; therefore, the simulated piles will all be different, offering different grasp determination perspectives. More specifically, for any random pile of objects, a grasp approach direction can be randomly chosen, and a grasp that is close to that approach direction can be tested in simulation. The individual object grasp simulation (the box 330) may be repeated for each simulated pile of objects until all of the objects have been grasped (in simulation) and removed from the bin.

By repeating the steps in the boxes 320 and 330, each grasp may be simulated under different conditions—including objects tangled together, objects partially exposed but jammed in place by other objects in the pile, and bin sides/corners. In addition, variations and uncertainties may be incorporated in the grasp simulation, including; object pose uncertainties, sensing uncertainties, friction uncertainties, and different surroundings (bins, objects). By performing grasp trials in these different situations, it is possible to simulate and record the robustness of each grasp under uncertainties, variations and interference.

Returning to FIG. 1, box 150, the point cloud, the grasp pose, and the success rate from the physical environment simulation at the box 140 (and discussed above relative to FIG. 3) are recorded to form the grasping database. The point cloud depth image 152 depicts the pile of objects from the box 140 from a particular perspective or point of view. From the image 152, the computations at the box 140 determined several candidate grasps which could be employed by the robot gripper. Each of the candidate grasps is represented by a region in the point map 154—indicating points which could be used as a grasp target, with the angle of approach defined by the point of view of the image 152, and using a gripper angle and grip width computed at the box 140. The points in the point map 154 are rank ordered in terms of grasp quality, and should result in a successful grasp of an object from the pile of objects in a bin.

The grasps generated and evaluated in the manner depicted in the flowchart diagram 100 of FIG. 1, and stored at the box 150, are later used as training samples for a neural network system which is employed in actual robotic part picking operations to identify a target grasp pose from 3D camera images of an actual bin full of parts. This is discussed relative to FIG. 4 below.

Figure 4:
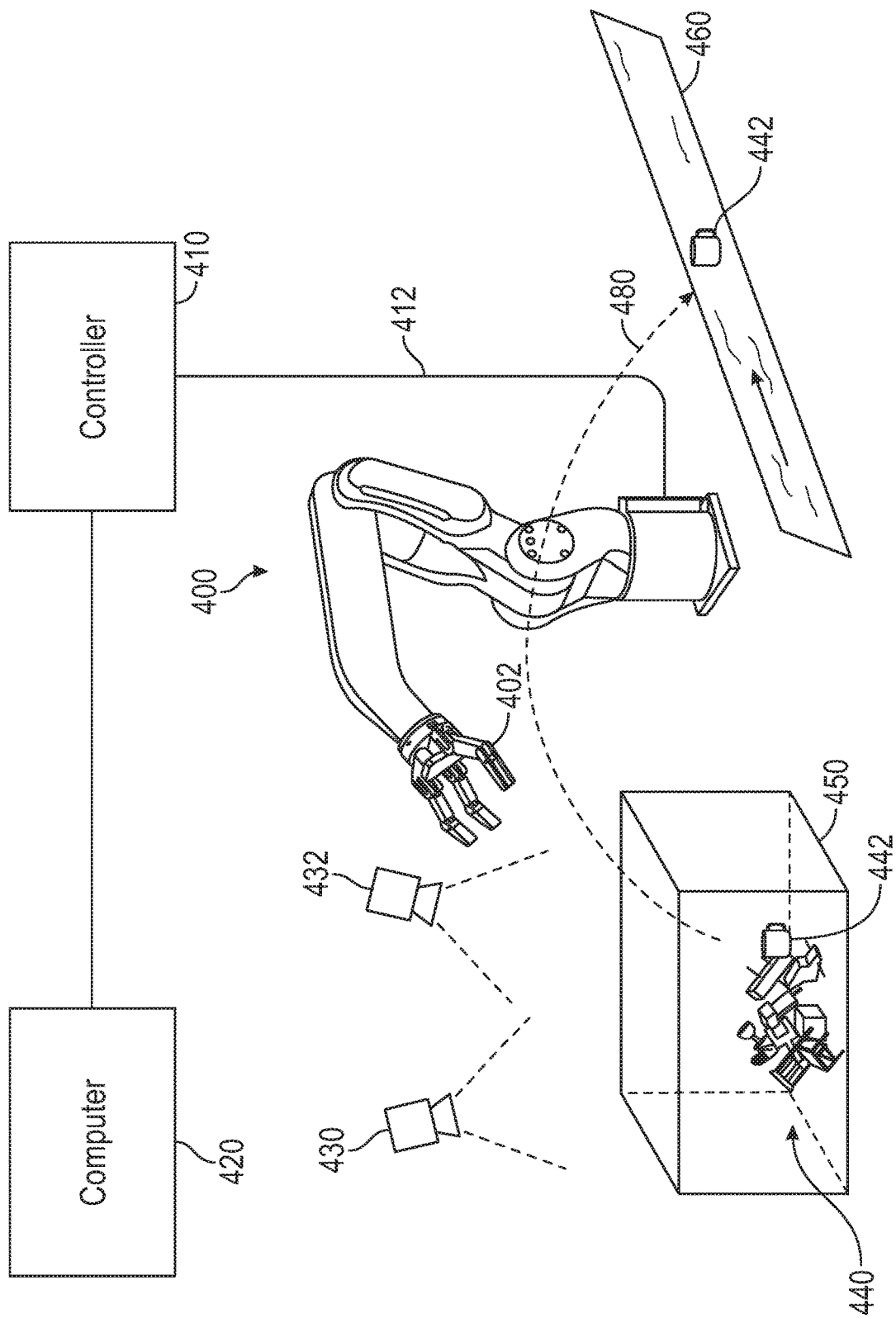
FIG. 4 is an illustration of a block diagram of a robotic part picking system which uses a neural network system for grasp computation, where the neural network system is trained using the grasps generated through the processes of FIGS. 1-3, according to an embodiment of the present disclosure.

FIG. 4 is an illustration of a block diagram of a robotic part picking system which uses a neural network system for grasp computation, where the neural network system is trained using the grasps generated through the processes of FIGS. 1-3, according to an embodiment of the present disclosure. A robot 400 having a gripper 402 operates within a workspace wherein the robot 400 moves parts or objects from a first location (a bin) to a second location (a conveyor). The gripper 402 is the gripper identified at the box 120 of FIG. 1.

Motion of the robot 400 is controlled by a controller 410, which typically communicates with the robot 400 via a cable 412. The controller 410 provides joint motion commands to the robot 400 and receives joint position data from encoders in the joints of the robot 400, as known in the art. The controller 410 also provides commands to control operation of the gripper 402 (rotation angle and width, and grip/ungrip commands).

A computer 420 is in communication with the controller 410. The computer 420 includes a processor and memory/storage configured to compute a high quality grasp for a bin full of objects in real time in one of two manners. In a preferred embodiment, the computer 420 runs a neural network system which is trained in advance for grasp learning using the grasping database from the box 150. The neural network system then computes grasps in real time based on live image data. In another embodiment, the computer 420 computes grasps during live robotic operations directly from the grasping database from the box 150—including point clouds, grasp poses, and success rates from the physical environment simulation. The computer 420 may be the same computer that performed all of the grasp generation calculations discussed above with respect to FIGS. 1-3.

A pair of 3D cameras 430 and 432 communicate with the computer 420 and provide images of the workspace. In particular, the cameras 430/432 provide images of objects 440 in a bin 450. The images (including depth data) from the cameras 430/432 provide point cloud data defining the position and orientation of the objects 440 in the bin 450. Because there are two of the 3D cameras 430 and 432 having different perspectives, it is possible to compute or project a 3D depth map of the objects 440 in the bin 450 from any suitable point of view.

The task of the robot 400 is to pick up one of the objects 440 from the bin 450 and move the object to a conveyor 460. In the example shown, an individual part 442 is selected, grasped by the gripper 402 of the robot 400, and moved to the conveyor 460 along a path 480. For each part picking operation, the computer 420 receives images of the objects 440 in the bin 450, from the cameras 430/432. From the camera images, the computer 420 computes depth maps of the pile of objects 440 in the bin 450. Because the camera images are provided from two different perspectives, depth maps of the pile of objects 440 can be computed from different points of view.

In the preferred embodiment, the computer 420 includes a neural network system which is trained for grasp learning. The neural network system is trained using supervised learning with the data from the grasping database of the box 150 (point clouds, grasp poses, and success rates from the physical environment simulation). The methods of FIGS. 1-3 of the present disclosure provide the quantity and diversity of data needed for complete training of a neural network system. This includes many different grasps for each object, and many different random piles of objects with target grasp DOF and grasp success rates. All of this data in the grasping database from the box 150 may be used to automatically train the neural network system. The neural network system on the computer 420 is then run in an inference mode during live robotic operations, where the neural network system computes a high quality grasp based on object pile image data from the cameras 430/432.

In another embodiment, the computer 420 directly identifies a grasp during live robotic operations based on the grasping database from the box 150. In this embodiment, the computer 420 knows in advance what types of objects 440 are contained in the bin 450, as this information is included with the grasping database from the box 150 (along with point clouds, grasp poses, and success rates from the physical environment simulation). When a depth map is found which includes an object (such as the object 442) in a position for a high quality grasp according to the previously generated grasp database, the computer 420 provides the individual object grasp data to the controller 410, which then commands the robot 400 to grasp and move the object.

In either embodiment described above, the grasp data provided to the controller 410 by the computer 420 includes 3D coordinates of the grasp target point, the angle of approach to be followed by the gripper 402, and the gripper angle of rotation and width (or positions of all finger joints). Using the grasp data, the controller 410 can compute robot motion instructions which cause the gripper 402 to grasp an object (e.g., the object 442) and move the object to the destination location along a collision-free path (the path 480).

Instead of the conveyor 460, the destination location could be a shipping container in which the objects are placed in individual compartments, or any other surface or device where the objects are further processed in a subsequent operation.

After the object 442 is moved to the conveyor 460, new image data is provided by the cameras 430/432, as the pile of objects 440 has now changed. The computer 420 must then identify a new target grasp based on the new image data and the previously generated grasp database. The new target grasp must be identified by the computer 420 very quickly, because the grasp identification and path computation must be performed in real time as fast as the robot 400 can move one of the objects 440 and return to pick up the next. The generation of the database of quality grasps—including corresponding depth image data, grasp point and approach angle and gripper configuration for each grasp—enables pre-training of the neural network system to perform the real-time computations during actual robotic operations very quickly and efficiently. The disclosed methods facilitate the generation of the grasp database for many objects and corresponding grippers easily and automatically.

The grasp generation technique discussed above offers several advantages over existing methods. The disclosed methods provide high quality, full-DOF grasp generation. The methods generate plausible grasps with surface contacts, thus the produced grasps are more robust to uncertainties and disturbances. Furthermore, the disclosed optimization formulation and customized iterative solver are highly efficient, computing grasps in times ranging from 0.06 sec for grippers with one joint to 0.5 sec for a 22 joint multi-fingered hand. As for the physical simulation, it is 10-100 times faster than real-world trials and is capable to test the grasp trials within 0.01-0.05 secs, producing one million grasps in 10 hours.

In addition, the disclosed methods generate diverse grasp data including different variations and interferences. The generation pipeline simulates the grasp performance under variations (object shape variation, pose uncertainties) and interference (tangle, jam, and corner). Therefore the later learning algorithm can learn robust grasping strategy based on these grasping data. The optimization framework works on suction grippers, conventional finger-type grippers, customized grippers, multi-fingered hands and soft grippers with minor adaptation. It also works on both under-actuated hand and fully-actuated hand. Finally, the disclosed methods are mathematically sound and simple to solve, optimizing rigorous grasp quality to produce plausible grasps. In spite of rigorous qualities and all the constraints, the algorithm is able to be solved with basic linear algebra in an iterative manner.

Throughout the preceding discussion, various computers and controllers are described and implied. It is to be understood that the software applications and modules of these computers and controllers are executed on one or more computing devices having a processor and a memory module. In particular, this includes a processor in the robot controller 410 which controls the robot 400 performing the object grasping, and in the computer 420 which performs the grasp generation computations and identifies objects for grasping in real time operations.

While a number of exemplary aspects and embodiments of the optimization-based grasp generation technique have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for generating a grasping database for use by a robot, said method comprising:
   providing an object database including three-dimensional (3D) shape data for a plurality of objects, and a gripper database including 3D shape data and actuation parameters for one or more grippers;
   performing an initialization, using a computer having a processor and memory, including selecting a gripper from the gripper database and selecting one or more objects from the object database;
   repeatedly performing an iterative optimization to compute a plurality of quality grasps on each of the selected objects by the selected gripper, where each quality grasp achieves a predefined quality metric,
   where performing the iterative optimization includes discretizing surfaces of the gripper and the object into points, computing contact point pairs and collision point pairs based on a current gripper pose relative to the object, computing an iteration of an optimization model, and updating the gripper pose and computing additional iterations of the optimization model until converged to achieve the quality metric,
   and where the optimization model includes an objective function defined to maximize the quality metric, and constraint functions defining contact surfaces on the gripper and the object as subsets of the discretized surfaces of the gripper and the object transformed by the gripper pose relative to the object, the contact surfaces on the gripper and the object as being equal, the contact surfaces on the gripper and the object having friction defined by a friction cone model, a penalty for penetration of the gripper into the object, and gripper joint angles remaining within angle limits; and
   performing a physical environment simulation to generate the grasping database, including repeatedly simulating a random pile of objects and repeatedly identifying a grasp pose to apply to the pile of objects using one of the quality grasps, and outputting data on each successful simulated grasp to the grasping database.

2. The method according to claim 1 further comprising using the grasping database, by the computer, during live robotic operation to identify a target object to grasp from a pile of objects, including analyzing depth images from a plurality of 3D cameras, computing one or more composite depth maps from the depth images, identifying the target object as an object from the grasping database having a quality grasp corresponding to one of the composite depth maps, and providing individual object grasp data to a robot controller which instructs the robot fitted with the gripper to grasp and move the target object.

3. The method according to claim 1 further comprising using the grasping database, by the computer to train a neural network grasp learning system using supervised learning, where the neural network grasp learning system after training is used in an inference mode to compute grasping instructions during live robotic operation, including providing the grasping instructions to a robot controller which instructs the robot fitted with the gripper to grasp and move an object.

4. The method according to claim 3 wherein the grasping instructions include 3D coordinates of a grasp target point, an angle of approach to be followed by the gripper, a gripper angle of rotation and gripper width or positions of all joints.

5. The method according to claim 1 wherein the 3D shape data for a plurality of objects includes solid models, surface models or surface point data for each of the objects.

6. The method according to claim 1 wherein the actuation parameters for the grippers include finger joint locations and pivot axis orientations, and finger joint flex angle ranges, for finger-style grippers.

7. The method according to claim 1 wherein repeatedly performing an iterative optimization includes randomly varying an initial gripper pose relative to the object.

8. The method according to claim 1 wherein the optimization model is convexified and simplified before solving, including changing the constraint functions from gripper configuration to increment of gripper configuration, defining a distance from each gripper surface point along an object surface normal to a nearest object point, and considering only point pairs which are within a threshold distance of each other.

9. The method according to claim 1 wherein the plurality of quality grasps on each of the selected objects includes at least 500 grasps, the at least 500 grasps are grouped by similar grasp pose and an average grasp is computed for each group, and only the average grasps are used in the physical environment simulation.

10. The method according to claim 1 wherein the data on each successful simulated grasp which is output to the grasping database includes a 3D depth map of the pile of objects, a robot gripper approach angle, a grasp point in three dimensions, a gripper angle and a gripper width or finger joint positions.

11. The method according to claim 1 wherein performing a physical environment simulation includes mathematically simulating dropping a plurality of objects into a bin, including gravity and contacts between the objects and each other and walls of the bin, and a resultant pile of objects in the bin is used in the physical environment simulation.

12. The method according to claim 1 wherein performing a physical environment simulation includes computing one or more composite depth maps of the simulated pile of objects, identifying quality grasps in the composite depth maps, and simulating a grasp with the gripper using a robot gripper approach angle, a grasp point in three dimensions, a gripper angle and a gripper width or finger joint positions.

13. A method for generating a grasping database for use by a robot, said method comprising:
  providing an object database including three-dimensional (3D) shape data for a plurality of objects, and a gripper database including 3D shape data and actuation parameters for one or more grippers;
  performing an initialization, using a computer having a processor and memory, including selecting a gripper from the gripper database and selecting a plurality of objects from the object database;
  performing an iterative optimization to compute a plurality of quality grasps on each of the selected objects by the selected gripper, including discretizing surfaces of the gripper and the object into points, computing contact point pairs and collision point pairs based on a current gripper pose relative to the object, computing an iteration of an optimization model, and updating the gripper pose and computing additional iterations of the optimization model until converged to achieve a quality metric, where the optimization model includes an objective function defined to maximize the quality metric, and constraint functions defining contact surfaces on the gripper and the object as subsets of the discretized surfaces of the gripper and the object transformed by the gripper pose relative to the object, the contact surfaces on the gripper and the object as being equal, the contact surfaces on the gripper and the object having friction defined by a friction cone model, a penalty for penetration of the gripper into the object, and gripper joint angles remaining within angle limits;
  grouping the quality grasps by similar grasp pose and an computing an average grasp for each group, and only storing the average grasps;
  performing a physical environment simulation to generate the grasping database, including repeatedly simulating a random pile of objects and repeatedly identifying a grasp to apply to the pile of objects using one of the average grasps, and outputting data on each successful simulated grasp to the grasping database; and
  using the grasping database to train a neural network grasp learning system using supervised learning, where the neural network grasp learning system after training is used in an inference mode to compute grasping instructions during live robotic operation, including providing the grasping instructions to a robot controller which instructs the robot fitted with the gripper to grasp and move an object.

14. A system for robot grasping of objects, said system comprising:
  a computer having a processor and memory, said computer configured to generate a grasping database, including;
  providing an object database including three-dimensional (3D) shape data for a plurality of objects, and a gripper database including 3D shape data and actuation parameters for one or more grippers,
  performing an initialization, including selecting a gripper from the gripper database and selecting a plurality of objects from the object database, performing an iterative optimization to compute a plurality of quality grasps on each of the selected objects by the selected gripper, including discretizing surfaces of the gripper and the object into points, computing contact point pairs and collision point pairs based on a current gripper pose relative to the object, computing an iteration of an optimization model, and updating the gripper pose and computing additional iterations of the optimization model until converged to achieve a quality metric, where the optimization model includes an objective function defined to maximize the quality metric, and constraint functions defining contact surfaces on the gripper and the object as subsets of the discretized surfaces of the gripper and the object transformed by the gripper pose relative to the object, the contact surfaces on the gripper and the object as being equal, the contact surfaces on the gripper and the object having friction defined by a friction cone model, a penalty for penetration of the gripper into the object, and gripper joint angles remaining within angle limits,
  performing a physical environment simulation to generate the grasping database, including repeatedly simulating a random pile of objects and repeatedly identifying a grasp to apply to the pile of objects using one of the quality grasps, and outputting data on each successful simulated grasp to the grasping database, and
  using the grasping database to train a neural network grasp learning system using supervised learning;
  a plurality of 3D cameras providing depth images to the computer of a pile of objects during live robotic operations, where the computer uses the neural network grasp learning system after training in an inference mode to compute grasping instructions;
a robot controller in communication with and receiving the grasping instructions from the computer; and
a robot fitted with the gripper to grasp and move an object based on commands from the controller.

15. The system according to claim 14 wherein the grasping instructions includes 3D coordinates of a grasp target point, an angle of approach to be followed by the gripper, a gripper angle of rotation and gripper width or positions of all joints.

16. The system according to claim 14 wherein performing a physical environment simulation includes mathematically simulating dropping a plurality of objects into a bin, including gravity and contacts between the objects and each other and walls of the bin, and a resultant pile of objects in the bin is used in the physical environment simulation.

* * * * *